United States Patent
Anantharam et al.

(10) Patent No.: US 9,059,973 B2
(45) Date of Patent: Jun. 16, 2015

(54) SECURING SENSITIVE INFORMATION IN A NETWORK CLOUD

(71) Applicant: INTERNATIONAL BUSINESS MACHINES CORPORATION, Armonk, NY (US)

(72) Inventors: Sushma Anantharam, Cupertino, CA (US); Sisir Chowdhury, Fremont, CA (US); Keshav G. Kamble, Fremont, CA (US); Chandarani J. Mendon, San Jose, CA (US); Vijoy A. Pandey, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

(21) Appl. No.: 13/742,214

(22) Filed: Jan. 15, 2013

(65) Prior Publication Data

US 2014/0201845 A1    Jul. 17, 2014

(51) Int. Cl.
G06F 7/04 (2006.01)
H04L 29/06 (2006.01)

(52) U.S. Cl.
CPC ........ H04L 63/0428 (2013.01); H04L 63/0245 (2013.01); H04L 63/0281 (2013.01)

(58) Field of Classification Search
CPC ............ H04L 9/06; H04L 63/04; G06F 21/10
See application file for complete search history.

(56) References Cited

U.S. PATENT DOCUMENTS

| | | | |
|---|---|---|---|
| 8,555,383 B1 * | 10/2013 | Marshall et al. | 726/22 |
| 2006/0034209 A1 * | 2/2006 | O'Neill | 370/328 |
| 2011/0302415 A1 | 12/2011 | Ahmad et al. | |
| 2012/0028712 A1 | 2/2012 | Zuili | |
| 2014/0040999 A1 * | 2/2014 | Zhang et al. | 726/5 |

FOREIGN PATENT DOCUMENTS

WO    WO2012003486 A1    1/2012

OTHER PUBLICATIONS

Smallwood, D et al.; Intrusion analysis with deep packet inspection: increasing efficiency of packet based investigation, AN-12507190, IEEE, 2011.
Yang L et al., APFA: Asynchronous Parallel Finite Automation for Deep Packet Inspection in Cloud Computing, AN-11396458, CloudCom 2009, LNCS 5931, 2009 pp. 529-540.
Trend Micro, Inc., Deep Security—Server and Application Protection for Dynamic Datacenters, 2010.
Jaatun, M. et al., Cloud Computing, First International Conference, CloudCom 2009.

* cited by examiner

*Primary Examiner* — Ali Abyaneh
(74) *Attorney, Agent, or Firm* — Shimokaji IP (57) ABSTRACT

Implementation of a secure network may be provided by analyzing packet traffic for sensitive information. Network processing elements found to be processing sensitive information may be classified as needing higher security. The classified network processing elements may be moved into a group of secure network processing elements.

15 Claims, 6 Drawing Sheets

SECURING SENSITIVE INFORMATION IN A NETWORK CLOUD

BACKGROUND

The present invention relates to network implementation, and more specifically, to a secure cloud implementation.

In a cloud-server network environment there can be different kinds of servers, for example web servers at the front-end, compute servers, database servers, and storage servers. Some of the servers handle confidential and sensitive data, for example credit card information, social security records, health care information, etc. Other servers within data center may handle other non-sensitive information. Networks may be set up with the aim to ensure that sensitive and confidential data are secure and will not be exposed to breaches. In a dynamic virtualized data center, it may be difficult to group all the servers handling confidential data together and dynamically secure them. Sometimes the sensitive data is known to some of the servers while not known to other servers in the network. The sensitive data might be stored on the compute servers but might not be on the storage or database servers. Sometimes data needs to be shared with some servers but not with the other servers.

SUMMARY

According to one embodiment of the present invention, a computer program product for securing sensitive information in a network, comprises a computer readable storage medium having computer readable program code embodied therewith. The computer readable program code is configured to identify one or more network processing elements as elements processing network traffic, analyze packets through the identified network processing elements for sensitive information, classify selected members of the identified network processing elements as elements processing sensitive information, and move the classified selected members into a secure group of network processing elements.

According to another embodiment of the present invention, a network system comprises a plurality network processing elements. A controller may be coupled to the plurality of networking processing elements. The controller may be configured to analyze packets, for sensitive information, passing through the plurality of network processing elements, classify selected members of the plurality of network processing elements as elements processing sensitive information, and move the classified selected members into a closed user group (CUG) of network processing elements.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics may include:

On-demand self-service: a cloud consumer can unilaterally provision computing capabilities, such as server time and network storage, as needed, automatically, without requiring human interaction with the service's provider.

Broad network access: capabilities are available over a network and accessed through standard mechanisms that promote use by heterogeneous thin or thick client platforms (e.g., mobile phones, laptops, and PDAs).

Cloud Software as a Service (SaaS): the capability provided to the consumer may be to use the provider's applications running on cloud infrastructure. The applications may be accessible from various client devices through a thin client interface such as a web browser (e.g., web-based email). The consumer need not necessarily manage or control the underlying cloud infrastructure including network, servers, operating systems, storage, or even individual application capabilities, with the possible exception of limited user-specific application configuration settings.

Resource pooling: the provider's computing resources may be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities may be rapidly and elastically provisioned, in some cases automatically to quickly scale out, and may be rapidly released to quickly scale in. To the consumer, the capabilities available for provisioning often appear to be unlimited and can be purchased in any quantity at any time.

As will be appreciated by one skilled in the art, aspects of the present invention may be embodied as a system, method or process, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage media having computer readable program code embodied thereon. The term "computer readable storage medium," as used herein, does not include any transitory forms of a computer readable storage media.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
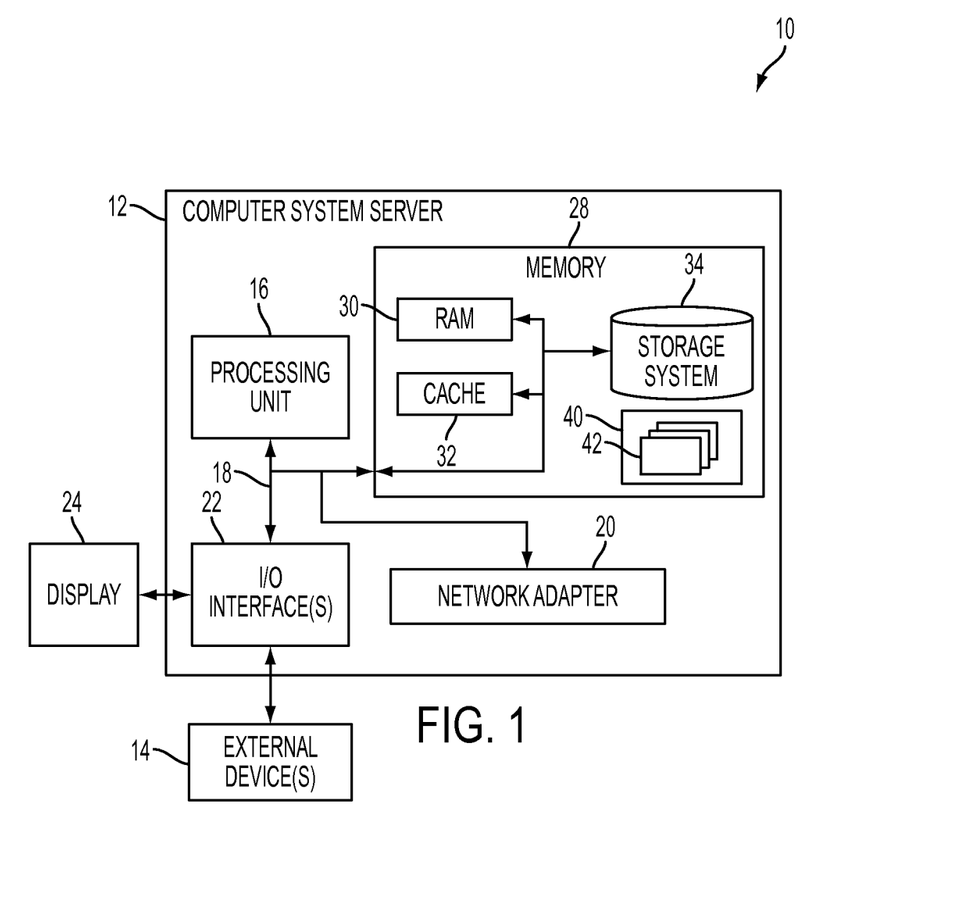
FIG. 1 depicts a cloud computing node according to an embodiment of the present invention.

Referring now to FIG. 1, a schematic of an example of a cloud computing node 10 is shown. The cloud computing node 10 illustrated is only one example of a suitable cloud computing node and is not intended to suggest any limitation as to the scope of use or functionality of embodiments of the invention described herein. Regardless, the cloud computing node 10 is capable of being implemented and/or performing any of the functionality set forth hereinabove.

In the cloud computing node 10 there is a computer system/server 12, which is operational with numerous other general purpose or special purpose computing system environments or configurations. Examples of well-known computing systems, environments, and/or configurations that may be suitable for use with the computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system/server 12 may be described in the general context of computer system executable instructions, such as program modules, being executed by a computer system. Generally, program modules may include routines, programs, objects, components, logic, data structures, and so on that perform particular tasks or implement particular abstract data types. The computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, a computer system/server 12 in the cloud computing node 10 is shown in the form of a general-purpose computing device. The components of the computer system/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 may typically include a variety of computer system readable media. Such media could be chosen from any available media that is accessible by computer system/server 12, including volatile and non-volatile media, removable and non-removable media.

The system memory 28 could include one or more computer system readable media in the form of volatile memory, such as a random access memory (RAM) 30 and/or a cache memory 32. The computer system/server 12 may further include other removable/non-removable, volatile/non-volatile computer system storage media. By way of example only, a storage system 34 can be provided for reading from and writing to a non-removable, non-volatile magnetic media device typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to the bus 18 by one or more data media interfaces. As will be further depicted and described below, the system memory 28 may include at least one program product having a set (e.g., at least one) of program modules that are configured to carry out the functions of embodiments of the invention.

A program/utility 40, having a set (at least one) of program modules 42, may be stored in the system memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. Alternatively, the computer system/server 12 can communicate with one or more networks such as a local area network (LAN), a general wide area network (WAN), and/or a public network (e.g., the Internet) via a network adapter 20. As depicted, the network adapter 20 may communicate with the other components of computer system/server 12 via the bus 18. It should be understood that although not shown, other hardware and/or software components could be used in conjunction with the computer system/server 12. Examples, include, but are not limited to: microcode, device drivers, redundant processing units, external disk drive arrays, RAID systems, tape drives, and data archival storage systems, etc.

Figure 2:
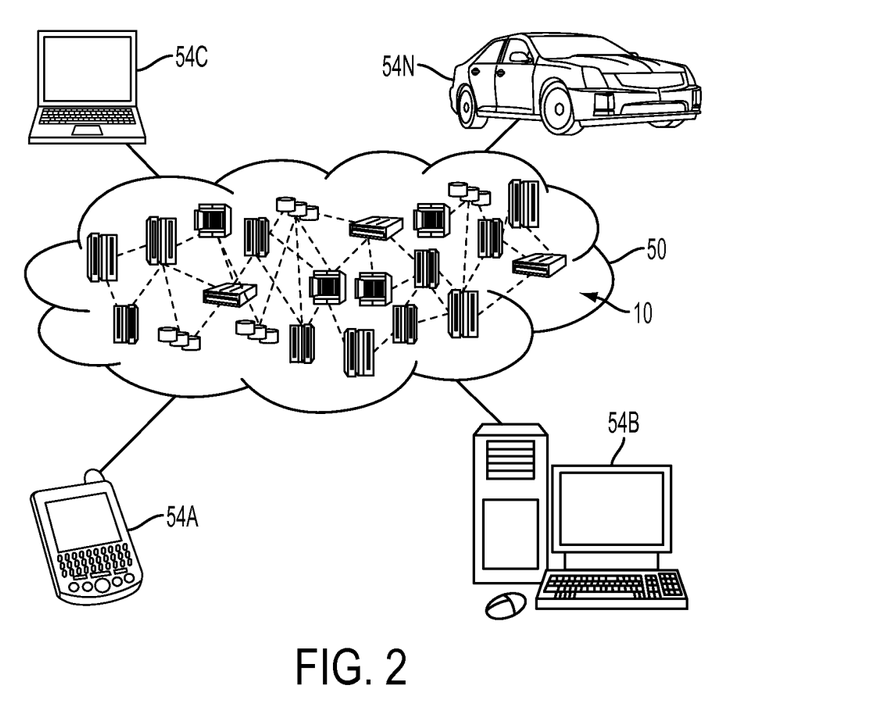
FIG. 2 depicts a cloud computing environment according to another embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, a personal digital assistant (PDA) or a cellular telephone 54A, desktop computer 54B, laptop computer 54C, and/or an automobile computer system 54N, may communicate. The nodes 10 may communicate with one another. They may be grouped physically or virtually, in one or more networks, such as Private, Community, Public, or Hybrid clouds as described hereinabove, or a combination thereof. This allows cloud the computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that the computing nodes 10 and the cloud computing environment 50 can communicate with any type of computerized device over any type of network and/or network addressable connection (e.g., using a web browser).

Figure 3:
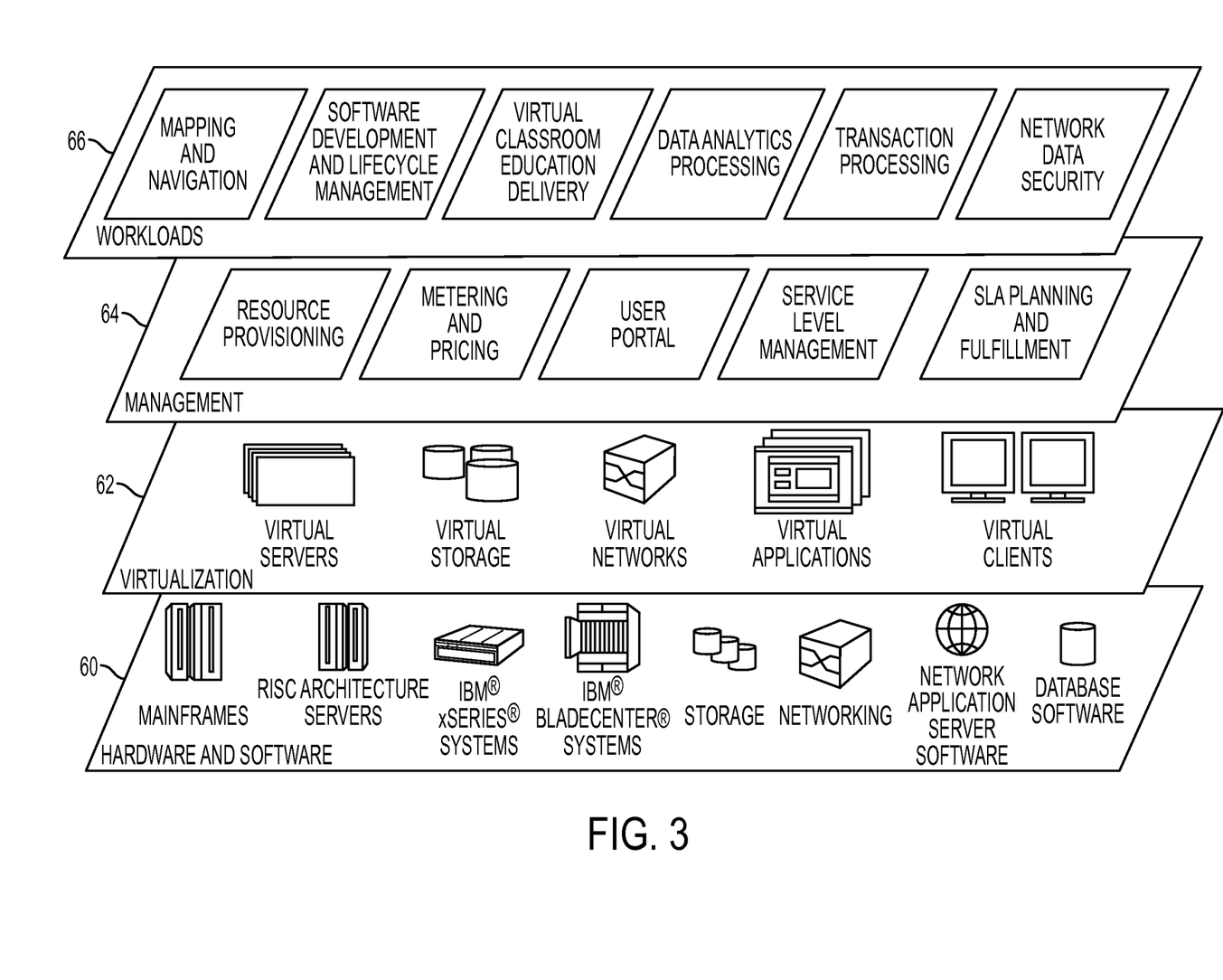
FIG. 3 depicts abstraction model layers according to yet another embodiment of the present invention.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 may include hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

A virtualization layer 62 provides an abstraction layer from which the following examples of virtual entities may be provided: virtual servers; virtual storage; virtual networks, including virtual private networks; virtual applications and operating systems; and virtual clients.

In one example, a management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

A workloads layer 66 may provide functionality for which the cloud computing environment may be utilized. Examples of workloads and functions which may be provided from this layer include: mapping and navigation; software development and lifecycle management; virtual classroom education delivery; data analytics processing; transaction processing; and secure cloud network implementation.

Figure 4:
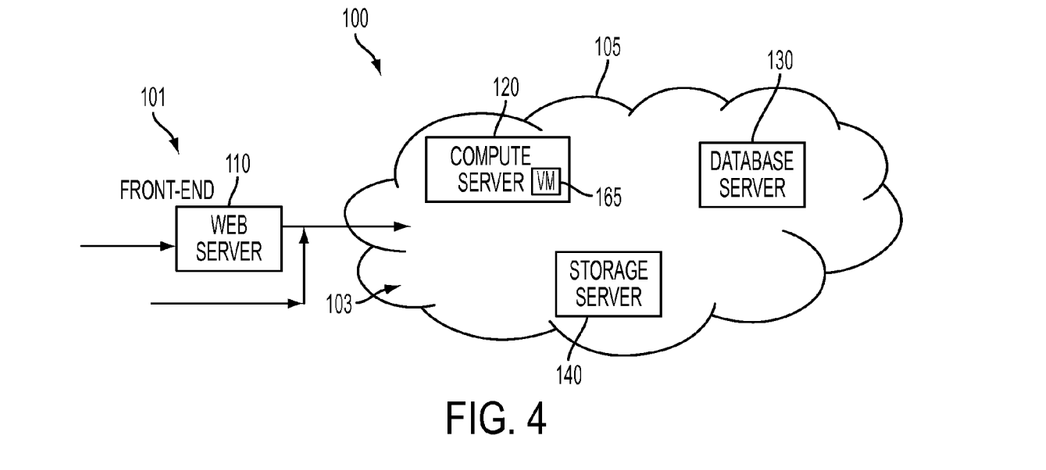
FIG. 4 is a block diagram of a system according to still another embodiment of the present invention.

Referring now to FIG. 4, a cloud network system 100 (referred to simply as the system 100 hereinafter) is shown according to an exemplary embodiment of the present invention. The system 100 may include a front end 101 comprising, for example, a web server 110. Virtualized data centers or clouds may have multiple physical servers, each with a hypervisor which provides server resource virtualization. The system 100 may include a cloud environment 105. The cloud environment 105 may include multiple network processing elements 103, for example a compute server 120, a database server 130, a storage server 140. Each compute entity on the hypervisor may be called a virtual machine (VM) 165. Each hypervisor may have a virtual switching module called a vSwitch which may facilitate for all the VMs hosted on a particular hypervisor the transmission and receipt of packets between each other or outside the server. The virtual switching module may interact with the hypervisor and may provide the switching functionality to all the VMs of that hypervisor. Inside the cloud environment 105, there may be multiple virtual switching modules since there are multiple hypervisors. The virtual switching module may be managed centrally via a controller. The controller may configure access or control functionality of the virtual switching modules. An example of control functionality may include an access control list (ACL) module which may be actively used for a secure cloud mechanism.

Sensitive data, for example social security numbers, credit card numbers, personal identification codes, etc. may usually be sent to and from the servers using XML schemas and may access SQL data bases hosted by database software. An example of an XML function that may be employed including a data format for social security numbers is shown in Table 1.

TABLE 1

```
DECLARE @xml XML
SET    @xml  =  '<SSNList><SSN><! [CDATA[**<-=] ] ></SSN><SSN><! [CDATA[**<-
=] ] ></SSN></SSNList>'
select x.y.query('.')
from @xml.nodes('SSNList/SSN') x(y)
select x.y.value('.', 'NVARCHAR (MAX) ')
from @xml.nodes('SSNList/SSN') x(y)
```

Figure 5:
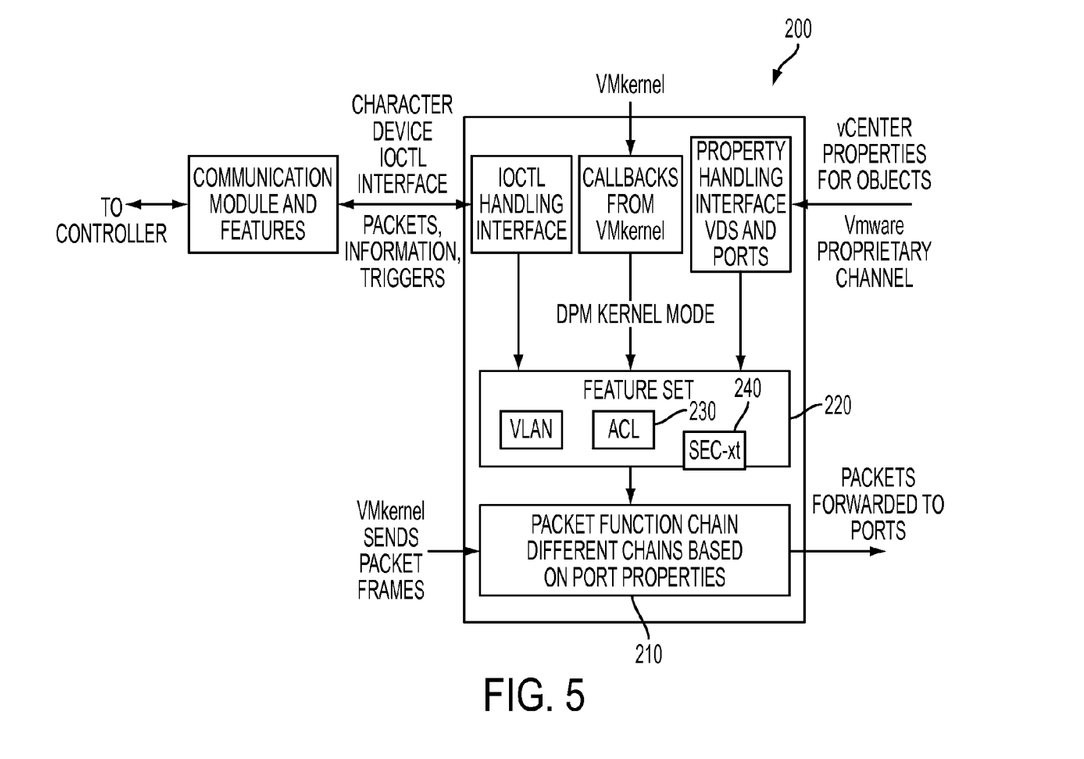
FIG. 5 is a block diagram of a kernel level module used in the system of FIG. 4.
Figure 6:
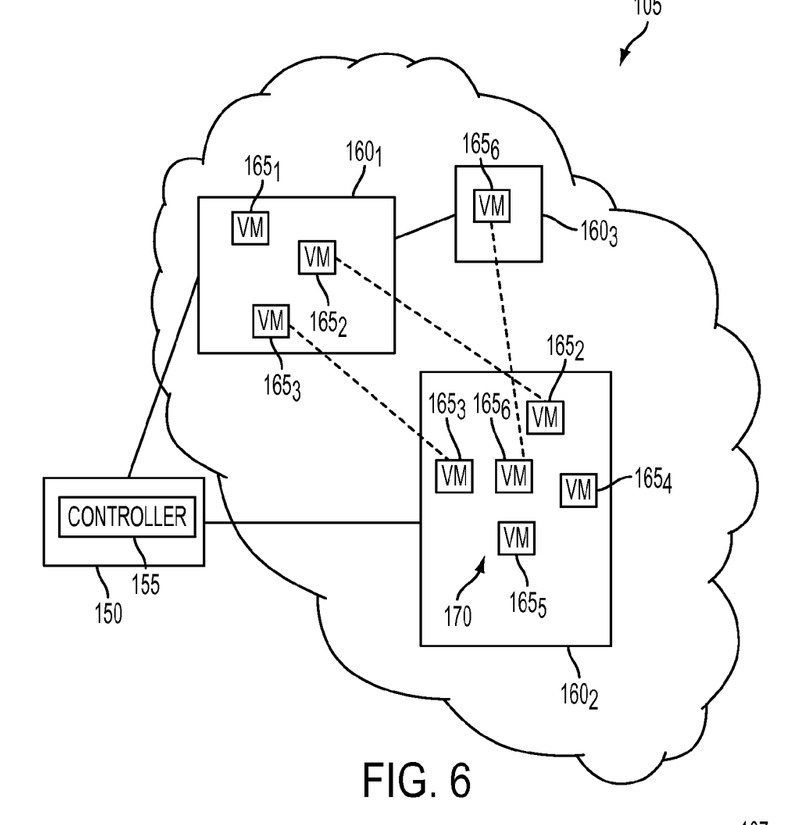
FIG. 6 is a block diagram showing the movement of network processing elements of FIG. 4.

FIG. 5 shows a kernel level module 200 of a virtual switching module functionality. FIG. 6 shows a block diagram depicting the movement of network processing elements in securing a network 105. With reference to FIGS. 5 and 6, a packet function chain 210 may send and receive packets between virtual interfaces and the hypervisor. A feature set module 220 may contains functionality and features implemented to process the packets. The feature set module 220 may include for example, an access control list (ACL) module 230 and a security extension module 240.

In an exemplary embodiment, deep packet inspection may be needed to classify each packet travelling through the network 105. The security level of the packet payload may be decided after looking deep in the payload of the packet. The payload may include, for example, XML data, data base entries, or access queries for confidential data. Packets found with a high level of security classification may then be sent for initial data collection. Some of the data collected may include the source IP and destination IP addresses of the packet. The servers $160_1$ and $160_2$ (referred to collectively as servers 160) or VMs $165_1$, $165_2$, $165_3$, $165_4$, and $165_5$, (referred to collectively as VMs 165) corresponding to those IP addresses may be classified as permitted to exchange confidential data and hence may be identified to be grouped into a potentially secure server or group of servers. When servers 160 or VMs 165 are classified as qualifying for a secure group, the classifications may be provided to a central virtual switching module controller 155 to take actions. The virtual switching module controller 155 may sometimes be referred to simply as controller 155. The virtual switching module controller 155 may be on a server 150 that may be outside the network 105 however in some embodiments, it may be within the network 105.

The ACL module 230 may be configured to work based on the various fields (tuples) in layer 2, layer 3, and/or layer 4 protocol headers. The number of ACL entries may be created in an ACL table. The entries may be bound to one or more virtual ports. Each ACL entry may have one or more actions associated with it. The actions may be user selectable.

The ACL module 230 functionality may be extended to look into the layer 7 level. The ACLs may thus be able to identify packets that use certain transport level ports, certain XML types of queries inside the application level payload, etc. As may be appreciated, this capability may be important to trap packets and forward them for different actions. The ACL module 230 may also be extended to have a new action named "FW_TO_SEC_EXT" which may be attached to packets to forward the packets to the security extension module 240.

The security extension module 240 may provide a set of security applications. For example, the security extension module 240 may provide analysis of packets and flows which are sent to it by the ACL module 230. The analysis may include deep packet inspection in which the application layer packet payload may be identified and classified per application. The security extension module 240 may identify details such as XML queries or responses, data associated with XML queries or responses, the confidentiality level of such data, and the classification of such data. The security extension module 240 may map which network processing elements 103 may be processing sensitive information. Based on the classification of data, the security extension module 240 may create a list where each entry may contain the following information regarding the source and destinations of the classified packet flows.

```
SecureVMTableEntry {Source IP Address; /* VM in the data center or
outside the data center. */
        Destination IP Address; /* VM in the data center. */
        Application Id;   /* Application e.g. FTP, SMTP, SQL Data base
access, etc. */
        Data Classification; /* SSN, Credit Card Data (CCD), HIPPA,
FINA, etc */
        Classification Level; /* Security level of such transaction. 0-7 */
            Action_Src_Req;   /* Action suggested on the source VM. i.e.
move to secure zone */
        Action_Dst_Req;   /* Action suggested on the destination VM. i.e.
move to secure zone */
            Misc.};
```

Figure 6A:
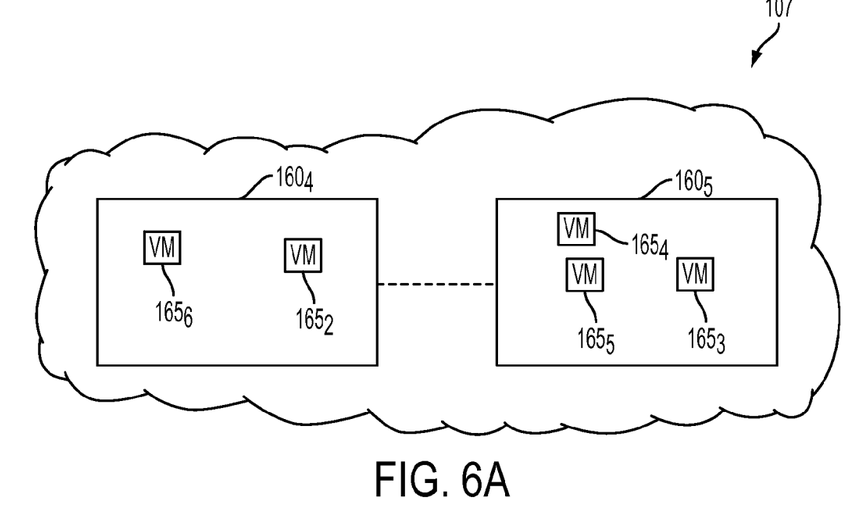
FIG. 6A is a block diagram showing the movement of network processing elements into a closed user group in the system of FIG. 4.

The information associated with VMs 165 may be forwarded to the controller 155 for a number of actions. For example, the controller 155 may take note of the information and presents it to the network administrator or data center administrator with details. The administrator may adjust the VMs' 165 policies and provide security to VMs 165 requiring protection for sensitive information. For example, the administrator may determine that the VM $165_2$ and the VM $165_3$ may be processing sensitive information. The VM $165_2$ and VM $165_3$ may be re-classified as needing higher security and may be moved to more secure zones or may be segregated with other VMs 165 with the same security classification level under one zone. For example, VM $165_2$ and VM $165_3$ may be moved from server $160_1$ and segregated into a secure server group 170 (which includes VM $165_4$ and VM $165_5$) on server $160_2$, thus making the data center more secure. Other VMs (for example, VM $165_6$ on server $160_3$) who interact with VM $165_2$ and VM $165_3$ for information may also be moved along with VM $165_2$ and VM $165_3$ into the secure server group 170. While the foregoing has been described in the context of VMs 165 moving from one server 160 to another server 160, in some embodiments, the segregated virtual machines may span more than one server 160. Referring to FIG. 6A for example, VMs 165 needing higher security may be moved into a closed user group (CUG) network 107. A CUG network 107 may include only VMs 165 and servers 160 authorized with a heightened level of security. The CUG network 107 may include one or more servers 160 (shown as servers $160_4$ and $160_5$). VMs $165_2$ through VM $165_6$ may be moved freely between servers $160_4$ and $160_5$ within the CUG network 107. However access to members of the CUG network 107 may require permissions that may be predetermined by, for example, the administrator.

The controller 155 may automate processes where a quick action may be taken in response to the report from the security extension module 240. The action may include moving all the associated VMs 165 from one physical server 160 to another server 160 depending upon the security level of the data handled, altering the network policies and firewall rules in those virtual switching modules and other such actions which makes the data center more secure. Thus, servers 160 or VMs 165 processing network traffic that does not include sensitive information need not interact with servers 160 or VMs 165 processing sensitive information.

Figure 7:
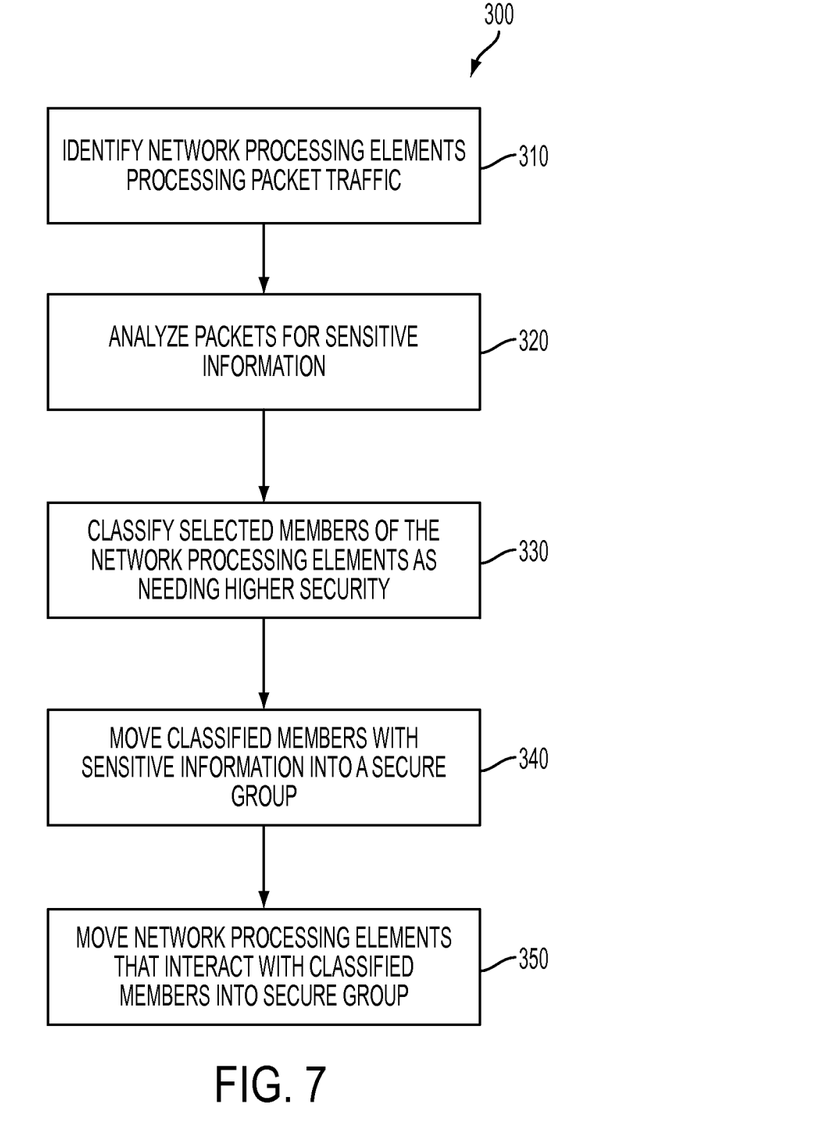
FIG. 7 is a flowchart of a method of securing a network according to yet another embodiment of the present invention.

Referring now to FIG. 7, a method 300 of securing a network is shown according to an exemplary embodiment of the present invention. The controller may identify (310) one or more network processing elements processing network traffic. The controller may analyze (320) packets passing through the identified network processing elements for sensitive information. The controller may classify (330) selected members of the identified network processing elements as elements processing sensitive information. The controller may move (340) the classified selected members into a group of secure network processing elements. The controller may move (350) network processing elements that interact with classified members into the secure group.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for securing sensitive information in a network, the computer program product comprising a computer readable storage medium having computer readable program code embodied therewith, the computer readable program code being configured to:
   identify one or more network processing elements as elements processing network traffic;
   analyze packets received by and/or transmitted by the identified network processing elements for sensitive information;
   classify selected members of the identified network processing elements as elements processing sensitive information;
   create a list of the classified selected members, wherein the list includes at least one entry, associated with the classified selected members, selected from the group: a virtual machine IP address, a virtual machine database access, a packet data classification, an action suggested for a packet source or an action suggested for a packet destination; and
   move the classified selected members into a secure group of network processing elements based on the list of classified selected members and the at least one entry.

2. The computer program product of claim 1, wherein the network processing elements are servers.

3. The computer program product of claim 1, wherein the network processing elements are virtual machines.

4. The computer program product of claim 1, the computer readable program code being configured to attach a forwarding action to a packet, the forwarding action including instructions to send the packet to a security extension module.

5. The computer program product of claim 4, the computer readable program code being configured to control the security extension module to provide information to a controller to move either a source network processing element or a destination network processing element found to be processing sensitive information.

6. The computer program product of claim 1, the computer readable program code being configured to segregate the classified selected members from other identified network processing elements.

7. The computer program product of claim 1, wherein the other identified network processing elements are not allowed to interact with the classified selected members.

8. The computer program product of claim 1, the computer readable program code being configured to:
- identify, from the other identified network processing elements, network processing elements interacting with the classified selected members, and
- segregate the identified network processing elements interacting with the classified selected members along with the classified selected members.

9. A network system, comprising:
- a plurality network processing elements including microprocessor and memory; and
- a controller coupled to the plurality of network processing elements, the controller being configured to:
- analyze, for sensitive information, packets communicated with the plurality of network processing elements to determine a security classification level of the identified network processing element;
- classify selected members of the plurality of network processing elements as elements processing sensitive information based on a respective determined security classification level; and
- move the classified selected members into a respective closed user group (CUG) of network processing elements based on the respective determined security classification level of the classified selected members.

10. The system of claim 9, wherein the network processing elements are servers.

11. The system of claim 9, wherein the network processing elements are virtual machines.

12. The system of claim 9, including a security extension module configured to map which of the network processing elements are processing sensitive information.

13. The system of claim 9, wherein the classified selected members in the CUG are not allowed to interact with others of the network processing elements.

14. The system of claim 9, wherein one or more of the network processing elements that interact with the classified selected members for information are moved into the CUG.

15. The system of claim 9, wherein the controller is configured to segregate the CUG from network processing elements that are not processing sensitive information.

* * * * *